United States Patent [19]

Tooher

[11] Patent Number: 5,463,630
[45] Date of Patent: Oct. 31, 1995

[54] METHOD OF CONVERTING A PARALLEL, TIME-DIVISION MULTIPLEXED DATA STREAM INTO INDIVIDUAL SERIAL DATA STREAMS AND VICE VERSA, AND CONVERTER THEREFOR

[75] Inventor: Michael Tooher, Ditzingen, Germany

[73] Assignee: Alcatel N.V., Rijswijk, Netherlands

[21] Appl. No.: 273,976

[22] Filed: Jul. 12, 1994

[30] Foreign Application Priority Data

Jul. 14, 1993 [DE] Germany ............... 43 23 521.2

[51] Int. Cl.⁶ .................................................. H04J 3/00
[52] U.S. Cl. .................. 370/112; 341/100; 341/101; 370/99
[58] Field of Search ............ 370/68, 99, 112; 341/100, 101; 377/64, 77

[56] References Cited

U.S. PATENT DOCUMENTS

| | | | |
|---|---|---|---|
| 4,924,464 | 5/1990 | Baylock | 370/112 |
| 5,243,600 | 9/1993 | Mori et al. | 370/112 |
| 5,371,741 | 12/1994 | Entani | 370/112 |

FOREIGN PATENT DOCUMENTS

| | | |
|---|---|---|
| 0176148 | 9/1985 | European Pat. Off. . |
| 0386828 | 2/1990 | European Pat. Off. . |

OTHER PUBLICATIONS

"The Alcatel ATM Coupling Field and its Properties" by D. Bottle et al, Electrical Communications, vol. 64, No. 2/3, 1990, pp. 156–165.

*Primary Examiner*—Benedict V. Safourek
*Attorney, Agent, or Firm*—Ware, Fressola, Van Der Sluys & Adolphson

[57] ABSTRACT

A method of converting a parallel, time-division-multiplexed data stream into individual serial data streams wherein the individual parallel data words are written in parallel into and read serially from one of a plurality of buffers, wherein each parallel data word is presented simultaneously to the parallel inputs of all buffers, and that for each data word, the inputs of only one buffer are enabled. Also a converter for converting two or more individual serial data streams into a single parallel, time-division-multiplexed data stream, having one buffer per serial data stream which can be written into serially and read from in parallel, wherein all buffers are connected in parallel at the output end, that the outputs of each buffer can be enabled, and that a decoding device is provided on the parallel side which makes it possible to enable the outputs of one buffer at a time.

10 Claims, 4 Drawing Sheets

METHOD OF CONVERTING A PARALLEL, TIME-DIVISION MULTIPLEXED DATA STREAM INTO INDIVIDUAL SERIAL DATA STREAMS AND VICE VERSA, AND CONVERTER THEREFOR

TECHNICAL FIELD

The invention concerns a method for converting a parallel, time-division multiplexed data stream into individual serial data streams and vice versa. It is also directed to converters to perform these methods of converting data.

BACKGROUND OF THE INVENTION

Such methods and the corresponding converters are known, for example, from the D. Boettle et al article "Alcatel ATM Switch Fabric and Its Properties", Electrical Communications, Volume 64, No. 2/3, 1990, pp. 156–165, particularly FIG. 7 with its respective description. The depiction is of a combined space and time coupling element from the switching technology. It has 32 serial inputs and 32 serial outputs. Each input data stream and each output data stream is composed of several individually time-division multiplexed data streams, between which switching can take place in any way. In the example, the data streams are asynchronously combined into an ATM (Asynchronous Transfer Mode) data stream. Comparable coupling elements for synchronously multiplexed STM (Synchronous Transfer Mode) data streams are also present. The switching takes place in that all input data streams are combined by a multiplexer into a supermultiplexed data stream, are input into a central memory, are read from the central memory in a different sequence, and form a second supermultiplexed data stream, which is then distributed by a demultiplexer to the individual outputs.

For various reasons, the supermultiplexed data stream is in parallel form in the cited article and also in other examples. One reason is the reduced processing speed with parallel processing. Another reason is that when corresponding pans of the data stream, such as data words in the STM, or cells or at least larger pans of cells in the ATM, are stored in the central memory, they must be stored together, for which parallel processing is available.

The solution of the example has an intermediate step on the input and the output side, where the data streams are present in a parallel form, but not yet or no longer as supermultiplexed data streams. These intermediate steps inevitably contain a large number of lines, which however can only operate at a clearly reduced transmission speed. Basically, the possibility to change the conversion sequence exists, so that a serial supermultiplexed data stream is used as the intermediate step. However, it would then have a very high transmission speed, which is usually not possible with this technology.

The present invention provides help with the method and converters used to perform such data conversions. In particular, it is directed to a method of converting a parallel, time-division-multiplexed data stream into individual serial data streams, wherein the individual parallel data words are written in parallel into and read serially from one of a plurality of buffers, characterized in that each parallel data word is presented simultaneously to the parallel inputs of all buffers, and that for each data word, the inputs of only one buffer are enabled. It is also directed to a converter for converting a parallel, time-division-multiplexed data stream into individual serial data streams, comprising one buffer per serial data stream which can be written into in parallel and read from serially, characterized in that all buffers are connected in parallel at the input end, that the inputs of each buffer can be enabled, and that a decoding device is provided on the parallel side having means for enabling one of the buffers at a time.

Therein demultiplexers and parallel-serial converters are constructed together, so that demultiplexing and parallel-serial converting are performed in a single process. The same applies if the processes are reversed.

A particularly advantageous version results from the use of specially configured write-read memories, so-called application-specific RAM's. Memories with separate inputs and outputs (Dual-port RAM's) are used in this instance. The entire memory is subdivided into individually activatable sectors. Compared to other storage elements such as flip-flops, a RAM memory cell has a very simple structure. Compared to conventionally constructed (two-stage) converters, an entire converter according to the invention needs only about 20% of the otherwise required chip surface. Even so, there is a fairly large savings when the memories are duplicated for asynchronous operation and, in the well known manner, are alternately written into one and read out from another.

BRIEF DESCRIPTION OF THE DRAWINGS

In the following, the invention will be further explained by means of configuration examples with the aid of the attached drawings.

BEST MODE FOR CARRYING OUT THE INVENTION

Figure 1:
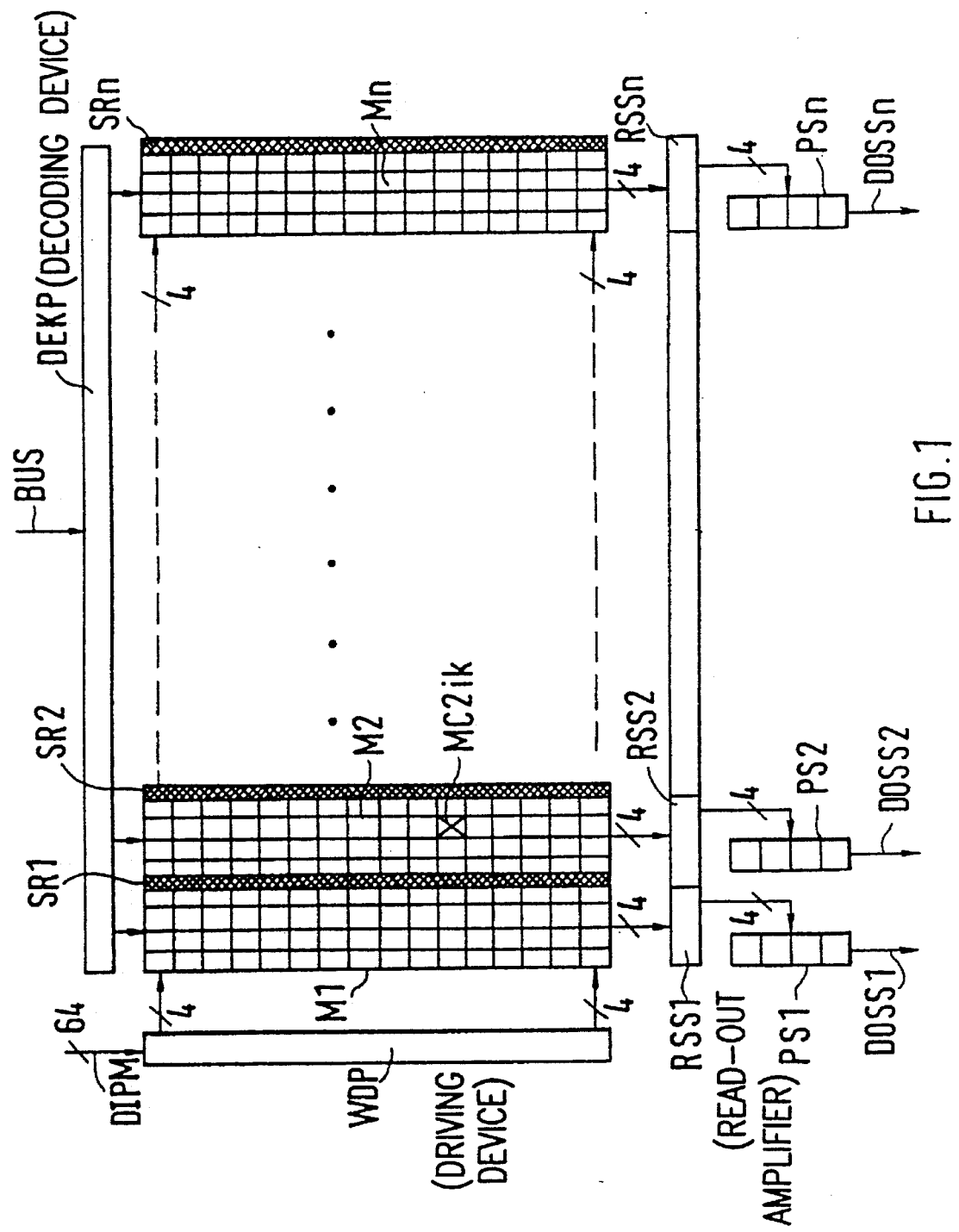
FIGS. 1 to 4 each depicts a configuration example of a converter according to the invention in a block circuit diagram.

The first configuration example shown in FIG. 1 of a converter for converting a parallel, time-division multiplexed data stream DIPM into n individual serial data streams DOSS1, DOSS2, ..., DOSSn, has a driving device WDP on the parallel side for entering data, n intermediate data stores M1, M2, ..., Mn with one assigned shift register SR1, SR2, ..., SRn, n read-out amplifiers on the serial side RSS1, RSS2, ..., RSSn, each with a downstream parallel-serial converter PS1, PS2, ..., PSn and a decoding device DEKP on the parallel side. Each intermediate data storage consists of 64 individual storage cells, which are arranged in 16 lines and 4 columns. Storage cell MC2ik is cited as an example. FIG. 1 further illustrates the connection of the decoding device DEKP on the parallel side to an external bus BUS.

The data stream DIPM to be converted arrives in 64 parallel lines at the time-division multiplex. Each of these 64 parallel lines is assigned to a storage cell in each of the intermediate data stores M1, M2, ..., Mn, while the inputs of all the storage cells assigned to the same line are connected in parallel. Because of this parallel connection, a driver is inserted into each line; together, all of these drivers form the driving device WDP on the parallel side.

The inputs of all 64 memory cells of an intermediate storage can be simultaneously activated by the decoding device DEKP, which then writes a complete 64-bit word of the data stream DIPM into this intermediate storage.

A time-division multiplexed data stream to be switched, with 64-bit data words, is only usual with asynchronous time-division multiplexing, thus in the ATM. 16-bit data words are normally in the STM.

In the ATM, the decoding device DEKP must be told from the outside via the bus BUS, to which of the individual serial data streams DOSS1, DOSS2, . . . , DOSSn the respective 64-bit data word belongs, in order to activate the correct intermediate storage for writing in. In the case of STM, the individual intermediate stores must be activated in cycles; in that event, the bus BUS would be used to time and synchronize a counter.

In principle, the reading of data from the intermediate stores M1, M2, . . . , Mn takes place bit by bit, but in this example in groups of four. Such partial parallelization of data streams considered to be serial, or the partial serialization of data streams considered to be parallel as well, is quite usual and well known to the expert. For example, data streams consisting of 48-bit words could be parallelized into a 16-bit word width, and three such successive 16-bit words could be treated together.

Thus, in the present example, four memory cells are read simultaneously and are entered into the assigned parallel-serial converters PS1, PS2, . . . , PSn via the respectively assigned serial-side read-out amplifiers RSS1, RSS2, . . . , RSSn, from where they are read out in full serial form. To that end, the outputs of all four memory cells on the same line of an intermediate storage can simultaneously be activated for read-out, for example by switching them from a high-impedance to a low-impedance condition. The outputs are parallel-connected in columns and go to the inputs of the parallel-serial converters through the read-out amplifiers.

The read-out of data from the intermediate stores is controlled by the shift registers SR1, SR2, . . . , SRn. The start of each shift register then receives a "one" when a data word is entered into the assigned intermediate storage. This "one" travels through the shift register and activates each output of four memory cells, sequentially line by line. A "zero" is then again placed at the start of the shift register.

The read-out of data is even simpler to control in single position cases. Such a case exists when the data words must be distributed in cycles from the input to the outputs. In that case, the partial line read-out is shifted one line with respect to the neighboring intermediate storage. For example, if line 7 of an intermediate storage is read, line 8 of the preceding intermediate storage and line 6 of the following intermediate storage are read simultaneously. All affected memory cells can be activated by a common read-out line, which passes in steps through all intermediate stores. This example requires a total of 16 such diagonal read-out lines, where the number of intermediate stores is then also n=16. A single shift register is then sufficient for the activation. The decoding device DEKP is also simplified in this instance, so that the columns are activated in cycles for the input. One vertical column line for writing and one diagonal line for read-out can then be activated jointly.

Figure 2:
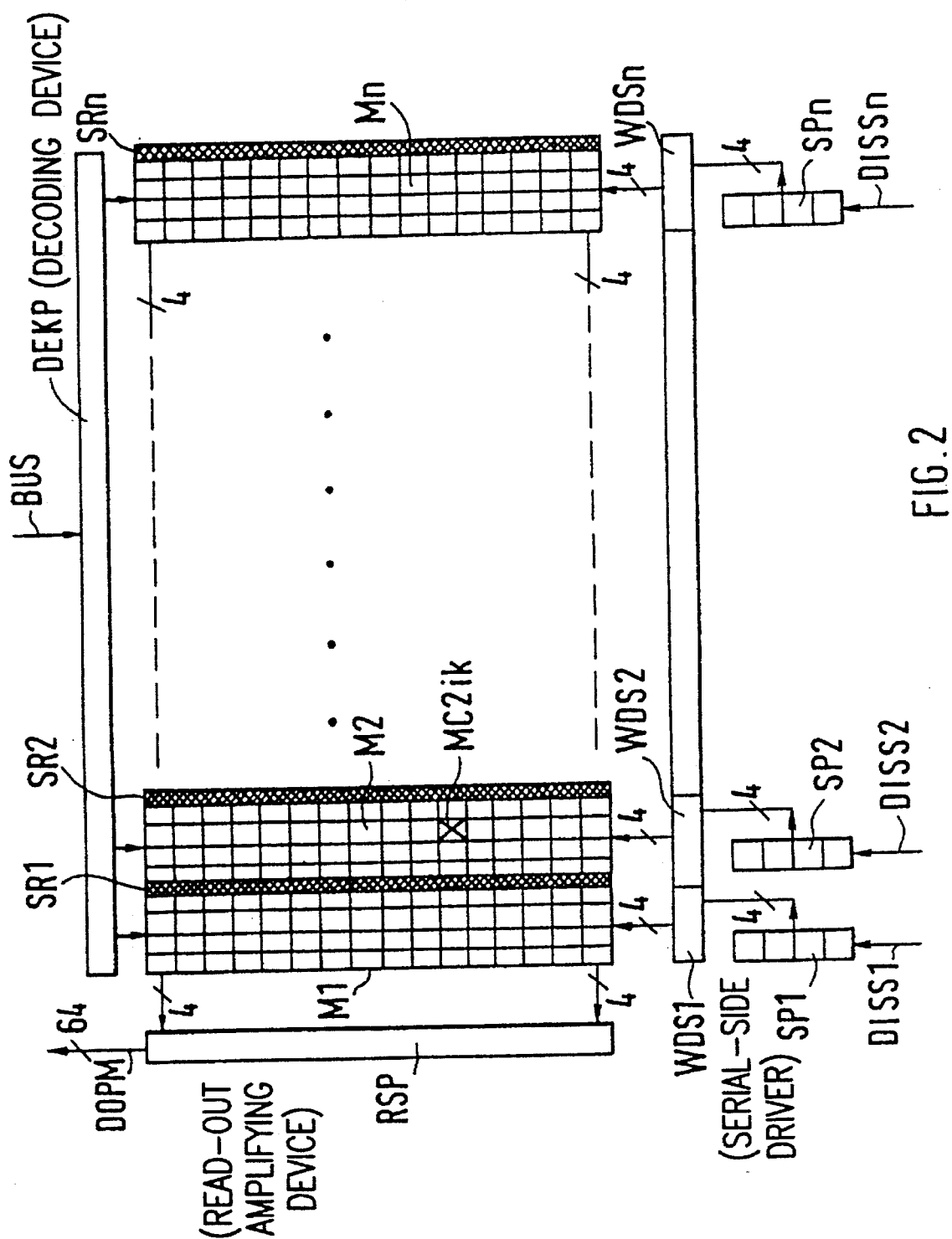

FIG. 2 depicts the analog converter for the opposite direction, thus from a plurality of individual serial data streams DISS1, DISS2, . . . , DISSn into a parallelized time-division multiplexed data stream DOPM. The structure of this converter is identical to that of FIG. 1, but the data travels exactly in the opposite direction. In this case the parallel-serial converters of FIG. 1 have been replaced by serial-parallel-converters SP1, SP2, . . . , SPn, instead of the read-out amplifiers on the serial side there are serial-side drivers WDS1, WDS2, . . . , WDSn for entering data, which take over the function of the driving device WDP on the parallel side, while it has been replaced by a read-out amplifying device RSP. In this converter, the outputs of the memory cells are connected in parallel by lines and the inputs by columns. The decoding device DEKP on the parallel side simultaneously activates the outputs of all 64 memory cells of an intermediate storage for reading out data, while the shift registers SR1, SR2, . . . , SRn activate the four memory cells on the same line of the corresponding intermediate storage for entering data. A "one" is then entered into a shift register when a new 64-bit data word begins in the corresponding data stream DISS1, DISS2, . . . , DISSn.

Figure 3:
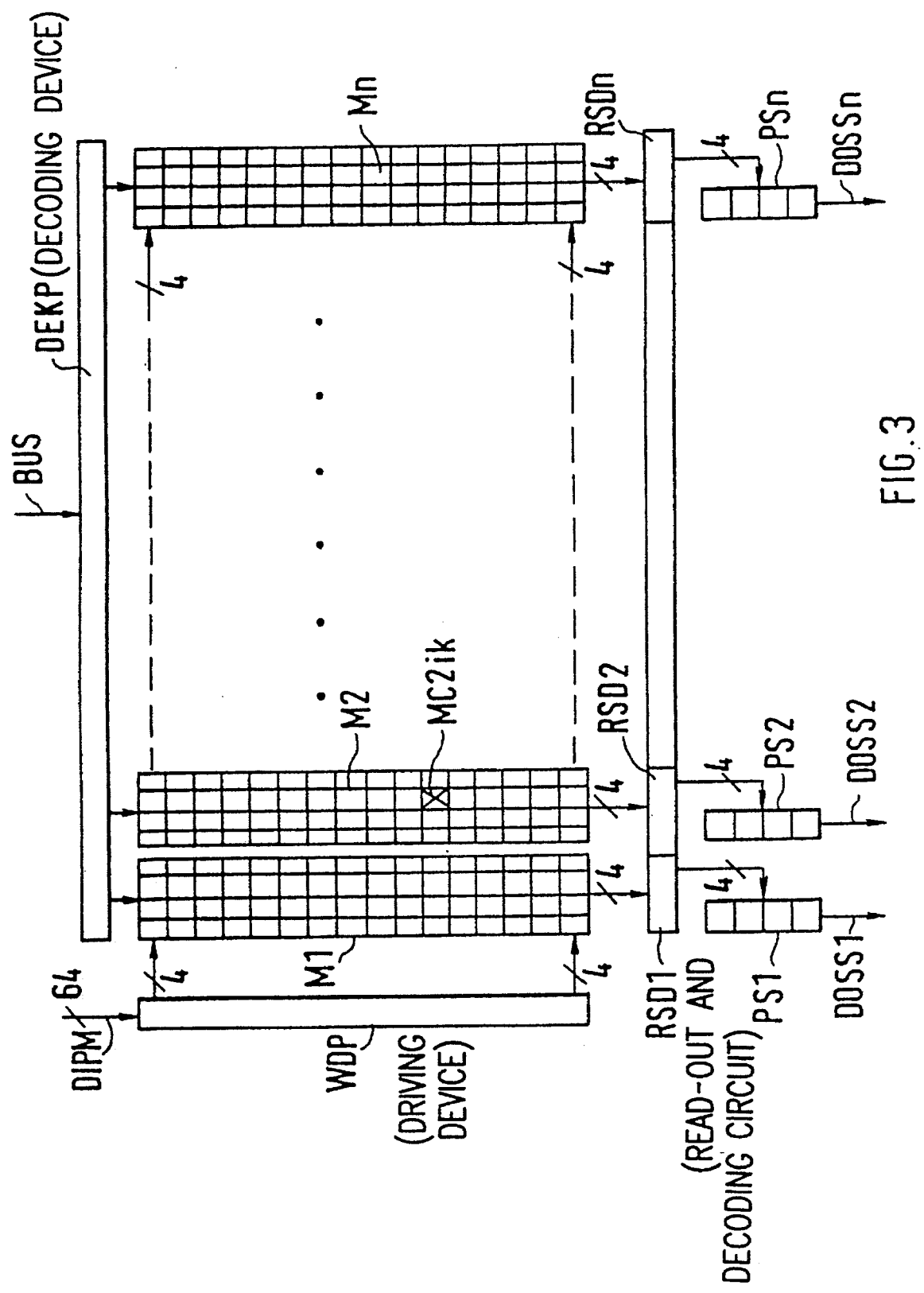
Figure 4:
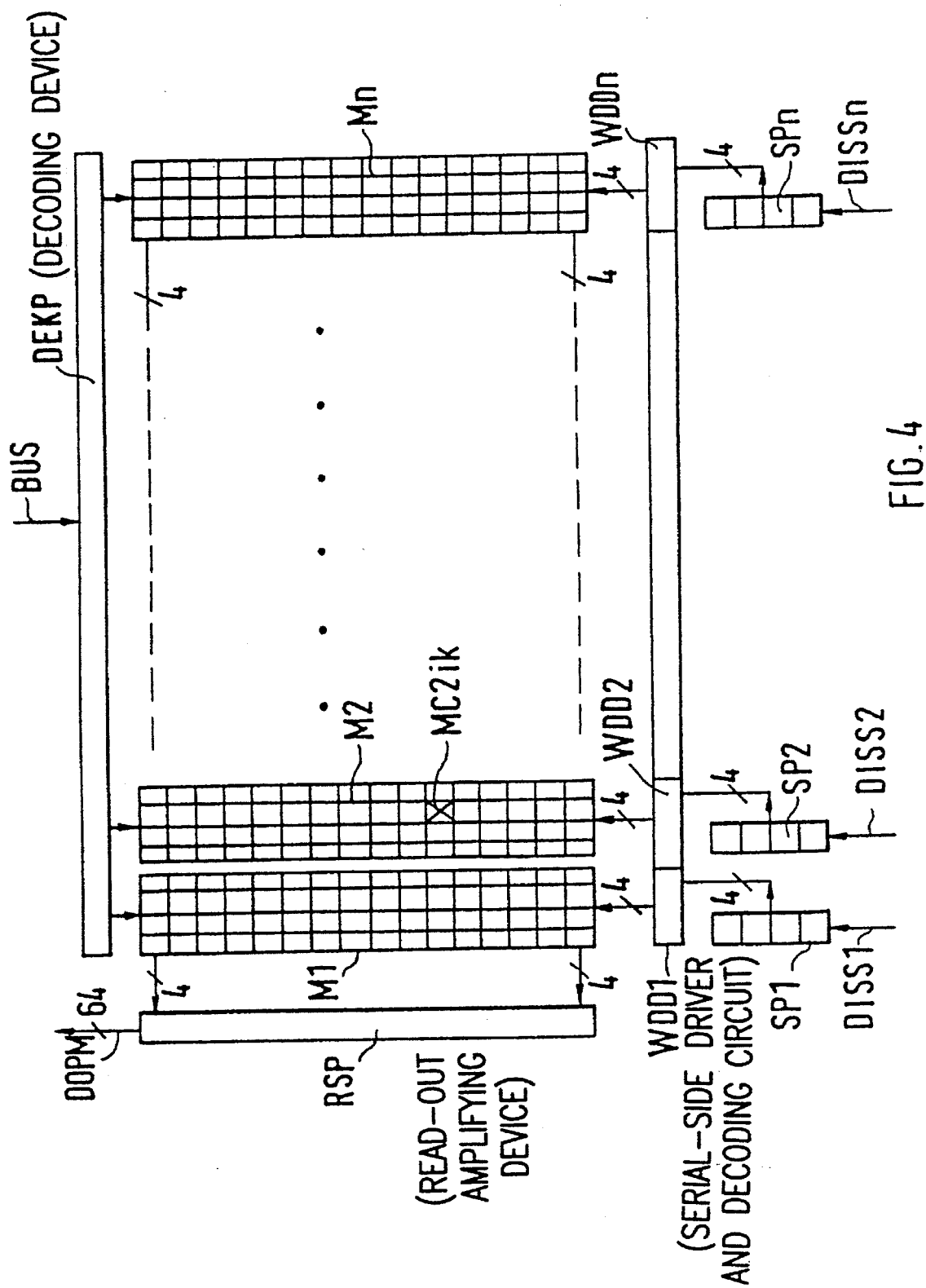

The converters in FIGS. 3 and 4 are modified configuration examples of the converters in FIGS. 1 or 2. The modification consists in that the shift registers have been replaced by decoding circuits, through which the memory cells are addressed. These decoding circuits, essentially modulo-16 counters, have been combined with the read-out amplifiers on the serial side into read-out and decoding circuits RSD1, RSD2, . . . , RSDn on the serial side, or with the drivers on the serial side into driver and decoding circuits WDD1, WDD2, . . . , WDDn on the serial side.

Another possible modification consists in changing the intermediate stores themselves into shift registers. No figure has been dedicated to this modification. The block circuit diagrams would be identical to those of FIGS. 3 and 4, only the names of the blocks would be different. The expert only needs a few indications here. Each column of the intermediate stores in FIGS. 3 and 4 would be replaced by a shift register, which in the analog case of FIG. 3 would be written in parallel and read out serially, and in the analog case of FIG. 4 would be written serially and read out in parallel.

What is claimed is:

1. A method of converting a parallel, time-division-multiplexed data stream (DIPM) forming parallel data words, into individual serial data streams (DOSS1, DOSS2, . . . , DOSSn), wherein the individual parallel data words are written in parallel into and read serially from one of a plurality of buffers (M1, M2, . . . , or Mn), each buffer having a plurality of parallel inputs, characterized in that each parallel data word is presented simultaneously to the parallel inputs of all buffers (M1, M2, . . . , Mn), and that for each data word, the inputs of only one buffer are enabled.

2. A method of converting two or more individual serial data streams (DISS1, DISS2, . . . , DISSn), each data stream forming data words, into a single parallel, time-division-multiplexed data stream (DOPM), wherein a plurality of buffers (M1, M2, . . . , Mn), each have a plurality of parallel outputs, and wherein one data word of each serial data stream is written serially into and read in parallel from one buffer (M1, M2, . . . , or Mn) associated with said data stream, characterized in that all parallel outputs of all buffers are read simultaneously, and that the outputs of only one buffer are enabled at a time.

3. A converter for converting a parallel, time-division-multiplexed data stream (DIPM), forming parallel data words, into individual serial data streams (DOSS1, DOSS2, . . . , DOSSn), wherein a plurality of buffers (M1, M2, . . . , Mn), each have a plurality of inputs, wherein one buffer (M1, M2, . . . , or Mn) per serial data stream can be written into in parallel and read from serially, characterized in that all of the plurality of buffers are connected in parallel at the input end, that the inputs of each buffer can be enabled, and that a decoding device (DEKP) is provided on the input end of the plurality of buffers, the decoding device having means for enabling one of the buffers at a time.

4. A converter as claimed in claim 3, characterized in that each buffer consists of a plurality of memory cells (MC2ik), each having inputs which can be enabled simultaneously, and each having outputs which can be enabled individually, that all outputs are connected in parallel, and that for each buffer, a decoding device (SR1, SR2, . . . , Srn; RSD1, RSD2, . . . , RSDn) is provided having means for cyclically enabling the outputs of the memory cells.

5. A converter as claimed in claim 4, characterized in that the decoding devices on the serial side are shift registers (SR1, SR2, . . . , SRn).

6. A converter as claimed in claim 3, characterized in that each buffer is a shift register.

7. A converter for converting two or more individual serial data streams (DISS1, DISS2, . . . , DISSn), each data stream forming data words, into a single parallel, time-division-multiplexed data stream (DOPM), wherein a plurality of buffers (M1, M2, . . . , Mn) each have a plurality of parallel outputs, and wherein one buffer of the plurality of buffers (M1, M2, . . . , or Mn) per serial data stream can be written into serially and read from in parallel, characterized in that all of the plurality of buffers are connected in parallel at the output end, that the outputs of each buffer can be enabled, and that a decoding device (DEKP) is provided on the output end of the plurality of buffers, the decoding device having means for enabling the outputs of one buffer at a time.

8. A converter as claimed in claim 7, characterized in that each buffer consists of a plurality of memory cells (MC2ik), each having outputs which can be enabled simultaneously, and each having inputs which can be enabled individually, that all inputs are connected in parallel, and that for each buffer, a decoding device (SR1, SR2, . . . , SRn; WDD1, WDD2, . . . , WDDn) is provided having means for cyclically enabling the inputs.

9. A converter as claimed in claim 8, characterized in that the decoding devices on the serial side are shift registers (SR1, SR2, . . . , SRn).

10. A converter as claimed in claim 7, characterized in that each buffer is a shift register.

\* \* \* \* \*